United States Patent Office 2,958,646
Patented Nov. 1, 1960

2,958,646

SILICEOUS CRACKING CATALYST WITH ATTRITION RESISTANT DISCONTINUOUS GLASS GLAZE

Alfred E. Hirschler, Springfield, Pa., assignor to Sun Oil Company, Philadelphia, Pa., a corporation of New Jersey No Drawing. Filed Apr. 11, 1958, Ser. No. 727,799

14 Claims. (Cl. 208—118)

This invention relates to a method of preparing cracking catalysts which are highly resistant to attrition and to the catalysts so-produced.

The use of siliceous catalysts for cracking hydrocarbons is well known. Such catalysts may be used in cracking processes such as fixed bed, moving bed or fluidized bed operations. In moving bed and fluidized bed operations, during the cracking step, the catalyst generally moves in a downwardly direction under the influence of gravity while contacting hydrocarbons which may be in liquid or gas phase, or in both liquid and gas phase. After passing through the cracking zone, the catalyst is regenerated as by burning off carbon deposits and is then elevated, or lifted, so that it may again descend through the cracking zone. In some instances deactivated catalyst particles are elevated to a regeneration zone located above the cracking zones. These lift operations may be mechanically performed, but gas lift operations wherein catalyst particles are blown upwardly by means of a high velocity gas stream have many advantages. For example, flue gas flowing through a vertical conduit at high velocity can advantageously be used to elevate the catalyst particles.

In cracking operations as above described, wherein catalyst particles move through a cracking zone and are then elevated for another pass through the cracking zone, catalyst attrition is a serious problem. This attrition occurs in the cracking zone, in the regeneration zone, and especially during gas lift operations by the grinding action of the catalyst particles against each other and against the confining surfaces of the apparatus. Catalyst attrition in some instances may be so severe as to render a cracking process uneconomical.

An object of the present invention is to provide a cracking catalyst resistant toward attrition. A specific object is to provide a process for preparing a siliceous cracking catalyst which is highly resistant toward attrition. A further object is to provide a process for the preparation of novel siliceous cracking catalysts especially especially effective for cracking hydrocarbons, and to the cracking of hydrocarbons with the novel catalyst.

By "siliceous cracking catalyst," as used herein, is meant a catalyst containing a major proportion of silica and which is known to exhibit activity toward cracking hydrocarbons. Synthetic catalysts such as silica-alumina, silica-magnesia, silica-zirconia, silica-alumina-magnesia and silica-vanadia catalysts, the preparation of which is well known, can be used in the present process with good results. Natural clays which may be acid activated such as fuller's earth, kaolin, the montmorillonite group including bentonite, and the like, can also be used in the process of the invention. Particles of such siliceous catalysts, which may be in the form of pellets or granules of a size suitable for use in a moving bed or fluidized bed hydrocarbon cracking process, are used in the present invention.

It has now been found that by heating particles of a siliceous cracking catalysts with glass, as hereinafter described, a discontinuous glassy coating is formed on the exterior surface of the catalyst and the resulting catalyst particles strongly resist attrition.

Glasses which can be used contain a major proportion of silica, minor proportions of sodium oxide, and one or more additional metal oxide such as potassium oxide, calcium oxide, lead oxide, boria, alumina, and magnesium oxide. Glasses commonly designated as soft glass, as soda lime, lead and borosilicate glass, for example, give good results in the process. The glass should have a softening point of from about 670° C. to 870° C., and by "softening point" is meant the temperature at which glass begins to deform under its own weight. The glass is comminuted for use in preparing the present catalyst. The particle size of the comminuted glass is preferably below 100 mesh (U.S. sieve series).

In order to prepare the catalyst particles of the invention, a minor proportion of comminuted glass is heated in contact with pellets of a siliceous cracking catalyst to a temperature sufficient to cause fusion between the glass and the cracking catalyst so that glazed areas are formed on portions of the exterior surface of the cracking catalyst particles. The glaze is a glass or glass-like film apparently formed by fusion of the glass with the siliceous catalyst. Formation of the glaze is substantially on the exterior surface of the catalyst pellet. The quantity of glass used must be such that only a discontinuous coating thereof is obtained on the pellets so that catalytic activity is not lost. From about 10% to 60%, and preferably from about 20% to 50%, of the total exterior surface area of the pellets is coated with the glassy film.

Advantageously the catalyst preparation is performed continuously while operating a process for cracking hydrocarbons. In this embodiment of the invention, comminuted glass is advantageously introduced into the cracking process as a slurry in the hydrocarbon feed. The addition may be continuous or intermittent. Only a small amount of glass, from about 0.2 to 1 pound per ton of catalyst per day, is used. While the mechanism of the formation of the glassy discontinuous surface is not known with certainty, it is believed to be formed in the catalyst regeneration step wherein relatively high temperatures are obtained on localized areas of the catalyst particles during the burning of carbon therefrom. It is known, however, that by introducing glass with the hydrocarbon feed and carrying out the cracking cycle, after cracking and subjecting the catalyst particles to regeneration including the burning of carbon therefrom, the regenerated catalyst particles exhibit a glaze on a portion of the surface thereof. It is also known that this glaze substantially reduces attrition of the catalyst particles without decreasing the catalytic activity thereof.

In another embodiment of the invention, the catalyst particles having a glassy discontinuous surface are prepared prior to use in a cracking operation. This is accomplished by admixing catalyst pellets with minor quantities of comminuted glass and heating the resulting admixture, preferably with agitation, to a temperature sufficient to form the glaze, usually a temperature of from about 670° C. to 870° C. or higher. When relatively high temperatures are employed, it is preferred to operate so that the entire catalyst is not heated to such a high temperature. For example, dropping a pellet partially coated with glass through a suitable furnace can be used with good results. The resulting catalyst particles containing the discontinuous glassy surface are then used in cracking processes.

As above described, the catalysts of the invention are especially effective for cracking hydrocarbons in processes wherein catalyst attrition is normally observed such as in moving bed and fluidized bed operations. Cracking conditions heretofore described are used such as temperatures of from about 400° C. to 550° C. and pressures of from atmospheric to 50 p.s.i. (pounds per square inch).

In accordance with the present invention, the loss of catalyst such as to catalyst fines is reduced at least 20% and such loss may be reduced by 50% or more. It is a further characteristic of the process of the invention that cracking activity of the catalyst is not appreciably decreased by the discontinuous glassy surface formed in accordance with the invention. Apparently by coating less than 50% of the catalyst particles, sufficient surface area remains so that a reduction in catalytic activity is not observed.

The following example illustrates the present invention:

Pellets of a synthetic silica-alumina cracking catalyst containing about 87% silica and 13% alumina and having an activity index of about 46 were contacted with comminuted, soft glass, the quantity of the soft glass used being sufficient to contact only portions of the surface of the catalyst pellet. "Activity index," as used herein, is a means of measuring the efficacy of a catalyst for cracking hydrocarbons and is determined by a method described by Alexander, Proceedings Am. Pet. Inst., 27 (III) 51 (November 1947). The composition of the soft glass approximated 3.1 parts of silica, 1 part of sodium carbonate, 1 part of calcium carbonate and a trace of iron oxide. With the glass particles contacting portions of the surface of the cracking catalyst pellet, the admixture was heated to a temperature of about 900° C., for about 2 minutes. On cooling, the examination of the catalyst pellet showed a discontinuous glassy glaze on about 50% of the exterior surface thereof. The resulting catalyst pellet, when used in a moving bed catalytic cracking process for converting hydrocarbons boiling in the range of from about 200° C. to 350° C. to gasoline hydrocarbons, exhibits undiminished cracking activity, and attrition of the catalyst pellets as measured by loss of catalyst to catalyst fines is decreased about 40%.

The invention claimed is:

1. Process for the preparation of a cracking catalyst resistant to attrition which comprises heating discrete granular solid particles of a siliceous cracking catalyst selected from the group consisting of synthetic silica-alumina, silica-magnesia, silica-zirconia, silica-alumina-magnesia and silica-vanadia cracking catalyst, and activated clay cracking catalyst, in contact with discrete granular solid particles of glass thereby to form a discontinuous glaze on 10 to 60% of the external surface of the siliceous cracking catalyst.

2. Process for the preparation of a cracking catalyst resistant to attrition which comprises heating discrete granular solid particles of a siliceous cracking catalyst selected from the group consisting of synthetic silica-alumina, silica-magnesia, silica-zirconia, silica-alumina-magnesia and silica-vanadia cracking catalyst, and activated clay cracking catalyst, in contact with a minor proportion of discrete granular solid particles of comminuted glass to a temperature sufficient to cause fusion of the glass components with the siliceous cracking catalyst components thereby to form a discontinuous glaze on 20 to 50% of the external surface of the catalyst particles.

3. Process according to claim 2 wherein said siliceous cracking catalyst is a silica-alumina catalyst.

4. Process according to claim 2 wherein said siliceous cracking catalyst is a silica-magnesia catalyst.

5. Process according to claim 2 wherein said siliceous cracking catalyst is a silica-zirconia catalyst.

6. Process according to claim 2 wherein said siliceous cracking catalyst is a silica-alumina-magnesia catalyst.

7. Process according to claim 2 wherein said siliceous cracking catalyst is a clay.

8. Process for the preparation of a cracking catalyst resistant to attrition which comprises heating discrete granular solid particles of a silica-alumina cracking catalyst in contact with discrete granular solid particles of glass having a softening point of from about 670° C. to 870° C. to a temperature of at least 670° C. for a time sufficient to cause fusion of the glass with the silica-alumina catalyst components, thereby to form a discontinuous glaze on 10 to 60% of the external surface area of the silica-alumina cracking catalyst.

9. A new catalyst effective for cracking hydrocarbons which consists of particles of a siliceous cracking catalyst selected from the group consisting of synthetic silica-alumina, silica-magnesia, silica-zirconia, silica-alumina-magnesia and silica-vanadia cracking catalyst, and activated clay cracking catalyst, having a discontinuous glaze on from about 10% to 60% of the external surface thereof, said glaze having been formed by heating a physical mixture of discrete particles of the siliceous cracking catalyst with a minor proportion of discrete particles of glass.

10. Process according to claim 1 wherein said glass is a soda lime glass.

11. Process according to claim 1 wherein said glass is a lead glass.

12. Process according to claim 1 wherein said glass is a borosilicate glass.

13. Process for the preparation of cracking catalyst which comprises heating a physical mixture of discrete granular cracking catalyst selected from the group consisting of synthetic silica-alumina, silica-magnesia, silica-zirconia, silica-alumina-magnesia and silica-vanadia cracking catalyst and activated clay cracking catalyst, and discrete granular particles of glass, at a temperature in the range from 670 to 870° C., to form a glaze on 10 to 60 percent of the external surface of the cracking catalyst particles, thereby to obtain catalyst which is more resistant to attrition than the original catalyst and which has cracking activity not appreciably decreased from that of the original catalyst.

14. Method for rendering cracking catalyst more resistant to attrition while employing the catalyst in the cracking of hydrocarbon oil, with subsequent regeneration of the catalyst by burning carbon deposits therefrom, which comprises contacting granular solid cracking catalyst selected from the group consisting of synthetic silica-alumina, silica-magnesia, silica-zirconia, silica-alumina-magnesia and silica-vanadia cracking catalyst and activated clay cracking catalyst with a slurry of comminuted glass in hydrocarbon oil under cracking conditions in a cracking zone, the amount of glass being in the range from 0.2 to 1 pound per ton of catalyst per day, and subsequently burning carbon deposits from the catalyst particles in a regenerating zone to obtain regenerated catalyst particles having a glaze on 10 to 60% of the total exterior surface area of the particles.

References Cited in the file of this patent

UNITED STATES PATENTS

| | | |
|---|---|---|
| 1,122,003 | Humphreys | Dec. 22, 1914 |
| 1,703,528 | Herthel et al. | Feb. 26, 1929 |
| 1,840,450 | Jaeger et al. | Jan. 12, 1932 |
| 2,229,361 | Bertsch | Jan. 21, 1941 |
| 2,253,285 | Connolly | Aug. 19, 1941 |
| 2,480,672 | Plank | Aug. 30, 1949 |
| 2,844,518 | Blanding et al. | July 22, 1958 |